June 21, 1932. W. H. REES 1,864,029

WEIGHING APPARATUS

Filed June 25, 1930   3 Sheets-Sheet 1

INVENTOR.
WILLIAM H. REES.
BY Charles S. Evans
HIS ATTORNEY

June 21, 1932. W. H. REES 1,864,029
WEIGHING APPARATUS
Filed June 25, 1930  3 Sheets-Sheet 2
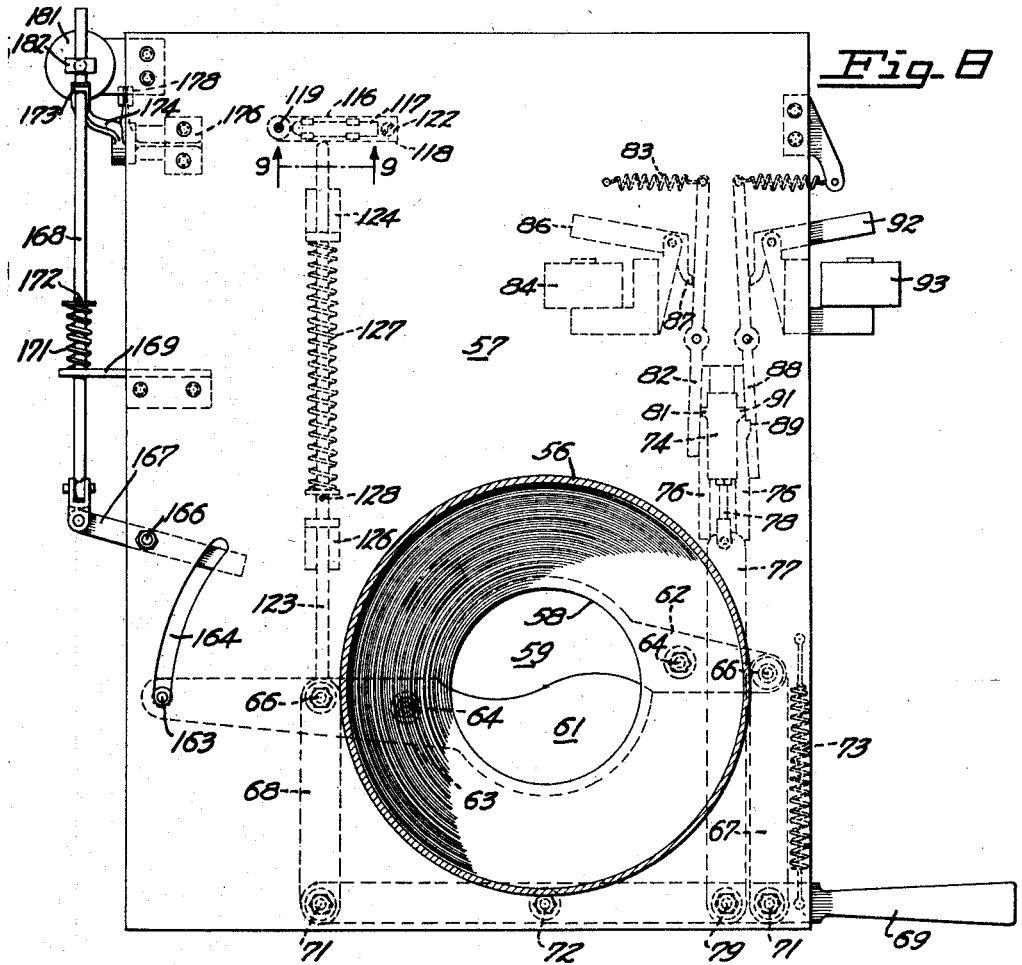
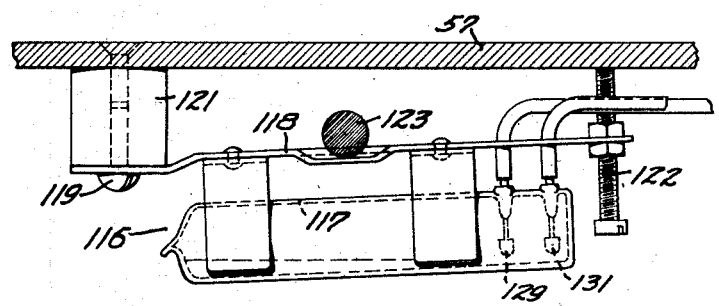
INVENTOR.
WILLIAM H. REES
BY Charles S. Evans
HIS ATTORNEY June 21, 1932. W. H. REES 1,864,029
WEIGHING APPARATUS
Filed June 25, 1930 3 Sheets-Sheet 3

INVENTOR.
WILLIAM H REES.
BY Charles S. Evans
HIS ATTORNEY

Patented June 21, 1932

1,864,029

UNITED STATES PATENT OFFICE

WILLIAM H. REES, OF BERKELEY, CALIFORNIA

WEIGHING APPARATUS

Application filed June 25, 1930. Serial No. 463,645.

My invention relates to weighing apparatus, and particularly to apparatus for weighing flowable materials such as grain, cement or dried meal.

It is among the objects of my invention to provide a weighing apparatus which will automatically fill a container with a predetermined weight of material.

Another object of my invention is the provision, in an apparatus of the character described, of automatically controlled means for tamping the container to tightly pack the enclosed material.

Another object of my invention is the provision of a weighing apparatus which will accurately indicate small weighings.

Further objects of my invention include the provision of a weighing apparatus having electric control means governed by a scale for regulating the tamping of the container, and the amount of material weighed; the electric control being enclosed in an air-tight compartment to eliminate danger when weighings are made in a dusty atmosphere of explosive character.

The invention possesses numerous other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawings:

Figure 8 is an enlarged horizontal sectional view showing the gate control; the view is taken in a plane indicated by the line 8—8 of Figure 1.

Figure 9 is an enlarged vertical sectional view showing the mercury control switch; the view being taken in a plane indicated by the line 9—9 of Figure 8.

Figure 1:
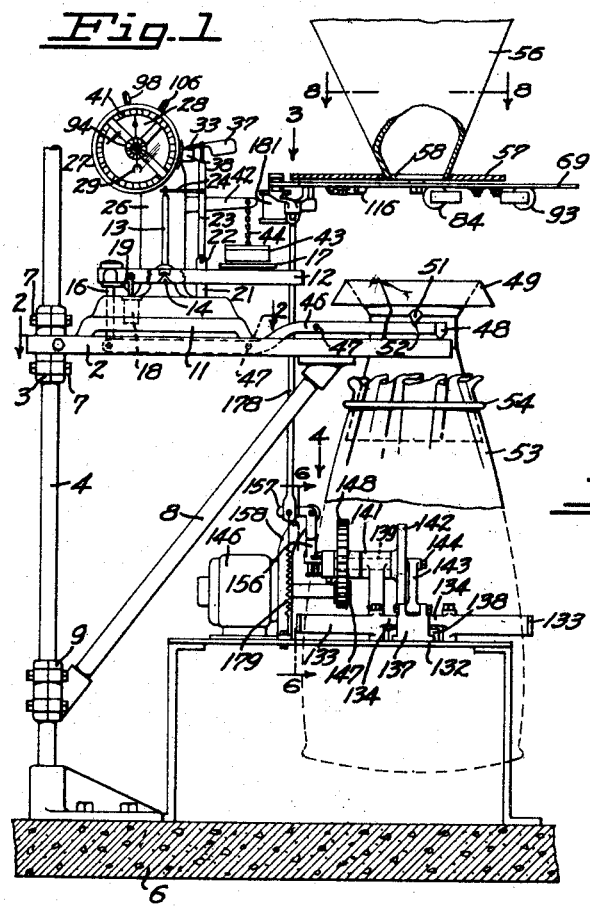
Figure 1 is a front elevation of the weighing apparatus embodying my invention; portions of the view being shown in section to disclose the construction more clearly.

In broadly descriptive terms, the weighing apparatus embodying my invention comprises a sensitive scale upon which is supported a container, such as a sack, into which a flowable material is discharged from a hopper. Means, preferably engaging the sides of the container, are provided for tamping the container so that the material will pack therein; and electric means, controlled by the operation of the scale, is provided for stopping the discharge of material after a predetermined amount has been weighed. Also, electric means, controlled by the operation of the scale, are provided for stopping the tamping of the container, and reducing the flow of material from the hopper, prior to the weighing of the predetermined quantity.

The portion of the electric control means associated with the scale is enclosed in an airtight compartment, so that the danger of explosion in a dusty atmosphere is eliminated.

In greater detail, the weighing apparatus embodying my invention comprises a vertically adjustable support including a pair of spaced bars 2; an end of each bar being fixed to a split sleeve 3, slidable on an upright 4 mounted on the floor 6. For holding the bars 2 in adjusted position, the bolts 7 are provided extending through the half portions of the split sleeve.

To give stability to the structure, a brace 8 is provided. One end of the brace is secured to the bars 2, and the other end is slidably secured to the upright 4 by a split sleeve 9, similar to the bar supporting sleeve 3. By this arrangement it is apparent that the support may be vertically adjusted; the purpose of the adjustment being to accommodate containers of various sizes.

Mounted on the adjustable support is a sensitive scale comprising a base 11 resting on the bars 2. Pivotally mounted on the scale base is a lever 12 carrying an upwardly extending rocker arm 13, secured to the lever at a point vertically above its fulcrum 14. One end of the lever 12 is provided with link 16, extending downwardly through the base 11; and the other end of the lever is provided with a counterweight carrying plate 17. A dash-pot 18, carrying a suitable fluid, is mounted on the base 11, and has its piston rod 19 pivotally secured to the lever 12 at a point between the link 16 and the lever fulcrum 14. The purpose of the dash-pot being to damp the lever in its movement to a given position.

Arranged on the base 11 is a yoke 21, carrying between its bifurcated ends a suitable spring strip or flex 22. Secured to the mid portion of this flex, and extending upwardly therefrom, is a flex arm 23, carrying a link 24 pivotally engaging the top of the rocker arm 13. By this arrangement, it is apparent that a movement of the lever 12 will be imparted to the flex arm 23; and any movement of the lever from its horizontal or normal position will be resisted by the flex. The amount of this resistance will depend, of course, upon the degree with which the flex resists torsional displacement.

Positioned above the scale base 11, on the standard 26, is a dial case 27 of suitable electrical insulating material; and the open forward end of the case is closed by a demountable transparent cover 28. Journaled within the case is a pointer 29 carrying a pinion 31 meshed with a rack 32. The rack is formed on the inner end of a rod 33 having a U-shaped portion 34 passing through the aperture 36 provided in the side of the case 27.

Rod 33 is pivotally connected to the upper end of the flex arm 23; and to maintain the rack 32 in engagement with the pointer pinion 31, the outer projected end of the rod is enlarged to provide a counterweight 37.

In order to maintain the airtightness of the dial case 27, a trough 38 is provided extending through the side of the case, so that the aperture 36 is included in the trough. A suitable liquid 39, which may conveniently be a light oil, is placed in the trough to seal the aperture 36. Since the U-shaped portion 34 of the rod 33 dips below the liquid, and in that condition passes through the case aperture, it is apparent that the rod may move back and forth without disrupting the airtight seal; this construction being clearly shown in Figure 10.

A graduated circular dial 41 is disposed about the inner circumference of the case 27 adjacent the rear of pointer 29 to permit the taking of readings. The dial is preferably calibrated to indicate pounds weight; and since the flex 22 is sensitive to small applied forces, weights in the order of fractions of a pound may readily be detected.

Means are provided for taking weighings greater than that detectable by the flex. An arm 42, projecting from the standard 26 and overhanging the lever 12, is adapted to carry a counterweight 43, suspended above the counterweight carrying plate 17 in the normal position of the lever. As the lever 12 moves, due to the action of a load, the plate 17 picks up the counterweight 43, and the pointer will then indicate weights in excess of the counterweight. If greater loads are to be weighted more counterweights may be added, as is the usual practice in scale operation.

When the load is suddenly released, the counterweights will not be dropped with a violent jar to injure the instrument, but will be caught up in their downward movement by the flexible suspending link 44. As a result, the lever 12 is permitted to return to its normal position without undue strain on the more delicate parts of the instrument. The dash-pot 18 acts as a damper, and tends to absorb the energy and slow down the lever to a smooth stop in its normal position.

Means are provided for supporting a container, so that the included material will be indicated by the scale. Pivotally connected to the link 16 of the scale are a pair of spaced levers 46 positioned between the bars 2 and rigidly connected by the transverse bars 47. The levers 46 are bent upwardly, and are pivoted on the bars 2 by the fulcrum pivots 48.

An inverted funnel 49 is mounted on the levers 46. Preferably the funnel is pivotally mounted; by means of pins 51 projecting from the funnel and resting in the notches 52 cut in the levers 46, so as to permit swaying of the container supported on the funnel, when material is discharged into it, and thereby relieve strain on the scale. The container, such as a sack 53, is supported on the funnel by a ring 54 surrounding the funnel, and of smaller diameter than the lower mouth thereof.

Means are provided for permitting discharge of material into the container. The material is held in a receptacle, such as the hopper 56, mounted on any suitable support. On the under side of the hopper is mounted a plate 57 having an aperture 58 registering with the bottom opening of the hopper. The aperture 58 is normally covered by a pair of co-acting gate portions 59 and 61 mounted on the under side of plate 57; this arrangement being shown in Figure 8.

These gate portions are semi-circular in shape, and have compound curved edges formed along their diameters which match together when the gate portions are in a closed position to provide a closure for the aperture 58. The gate portions have formed on opposite portions of their peripheries the arms 62 and 63, pivotally mounted on the plate 57 by suitable bolts 64.

Hand operated means is provided for opening the gate portions when it is desired to begin the weighing operation. The outer portions of arms 62 and 63 are pivotally connected, by means of suitable pins 66, to the parallel links 67 and 68 which in turn are pivoted to the handle bar 69 by means of the pins 71. The handle bar 69 is pivotally mounted on the plate 57 by a pin 72; and a spring 73, connected between the plate 57 and the handle bar 69, serves to normally hold the gate portions 59 and 61 closed.

When the gate portions are opened, they are held substantially in an opened position by a trigger 74 slidably mounted on the under side of plate 57 in suitable guideways 76. The trigger is pivotally connected to a link 77 by a yoke coupling 78 of adjustable length; the link 77 being in turn pivotally connected to the handle bar 69 by a pin 79. In the open position of the gate portions, a catch 81, formed on one side of trigger 74, engages the end of a finger 82 which is pivotally mounted on the plate 57, to thereby hold the gate open. The finger 82 normally bears against the trigger due to the action of a spring 83 connected between the finger and the plate 57.

An electro-magnet 84, of any suitable construction having a pivoted armature 86, is mounted on the under side of plate 57 adjacent the finger 82. The magnet armature 86 is provided with a hammer 87 adapted to strike against the finger when the magnet is excited, thus releasing the catch 81 and allowing the gate portions 59 and 61 to move toward the closing position.

Means are provided for allowing the gate portions to close partially, so as to reduce the flow of material. This is effected by a finger 88, similar to finger 82, but positioned on the opposite side of trigger 74. The finger 88 has a notch 89 therein adapted to engage a catch 91 on the trigger, as the gate portions move toward the closing position. By this construction, it is apparent that when the trigger catch 91 is lodged in the finger notch 89, the gate portions are held partially open. An armature 92, cooperating with a magnet 93, acts on the finger 88, in a manner similar to that of armature 86 and magnet 84, to effect complete closing of the gate portions after they are held partially open.

Means, controlled by the operation of the scale, are provided for releasing the trigger and catch arrangement to partially close the gate portions, and finally completely close the gate portions, after predetermined portions of the material are weighed. Mounted on the outer face of the transparent dial case cover 28 is a knob 94 having a stud journaled in the cover 28 and projecting therethrough.

Secured on the inner projected end of the knob stud is a bifurcated electrical conducting strip having an arm 96 adapted to bear against a semicircular conducting strip 97 disposed on the inner circumference of the dial case and connected with a terminal 98. The arm 96 is provided with an upturned tab or electrode 99, arranged so that the pointer 29 will pass closely adjacent the tab in its movement about the dial 41. The other arm 100 is provided with an upturned tab or electrode 101, arranged similar to electrode 99 of arm 96.

Extending in a direction opposite to that of the arm 96 is another arm 102, comprising an electrical conducting strip insulated from the bifurcated strip by an insulating connecting link 103. The arm 102 bears against a semi-circular conducting strip 104 connected with a terminal 106. An upturned tab or electrode 107 is provided on the arm 102, and is arranged in a manner similar to the tab or electrode 99 relative to the indicator 29.

The indicator 29 is of electrical conducting material; and by the construction just described, it will be seen that the indicator may act as an electrode, movable in accordance with the load on the scale. It will also be apparent that the indicator or electrode 29 will be separated from the tabs or electrodes 99, 101 and 107 by a variable gap, depending upon the load on the scale; and the particular position in which the gaps will be smallest, viz., those instants when the indicator passes by the tabs, will depend upon the adjustment made by rotating the knob 94. It is thus seen that provision is made for making the gaps smallest at predetermined scale readings.

The terminal 106, which connects with the electrode 107, is connected to one end of the secondary coil of a transformer 108; the other end of the secondary coil being connected to the indicator 29 of the scale. The indicator 29 is also connected to one end of the secondary of a second transformer 109; the other end of this secondary coil being connected to the terminal 98, which connects with the electrodes 99 and 101.

When an alternating current is applied to the primary coils of the transformers 108 and 109, which transformers are so constructed preferably to induce in their secondaries a voltage of 6,000 to 8,000 volts, and the tip of the scale indicator 29 registers with or is in a position of minimum gap with respect to either of the electrodes 99, 101 or 107, a spark is caused to jump between the electrodes 99, 101 or 107 and the indicator 29, which hence also serves as an electrode.

This momentary closing of either of the secondary circuits, by the passing of a spark between the indicator electrode and either of electrodes 99, 101 or 107, causes the effective reactance of either transformer 108 or 109 to be reduced materially. As a result, sufficient current will pass the primary coils of the transformers, and the current limiting coil 111 or 112 in series with the primary coils of transformers 108 and 109 respectively, so as to operate either relay 113 or 114 in series with the current limiting coils 111 and 112 respectively.

The relays and current limiting coils may be of any conventional construction; the purpose of the current limiting coils being, of course, to limit the current flowing through the relays so that they will not be subjected to unnecessarily high and destructive surges thereof.

Momentary closing of the relay 113, due to the registration of the indicator electrode 29 and electrode 107, actuates the magnet 84; as a result, the armature 86 is attracted to cause its hammer 87 to strike against the finger 82, and thereby release the trigger 74 when the gate portions are wide open and permit them to close to the partially open position.

On the other hand, momentary closing of the relay 114, due to the registration of the indicator electrode 29 and the electrode 99, actuates the magnet 93; hence, armature 92 is attracted to cause its hammer to strike against the finger 88, so as to release the trigger 74 when the gate portions are partially open and permit them to completely close. After stopping the discharge of material into the container sack, the sack and weighed contents therein are removed, and an empty sack is placed on the scale; the above cycle of operations being repeated.

Figure 5:
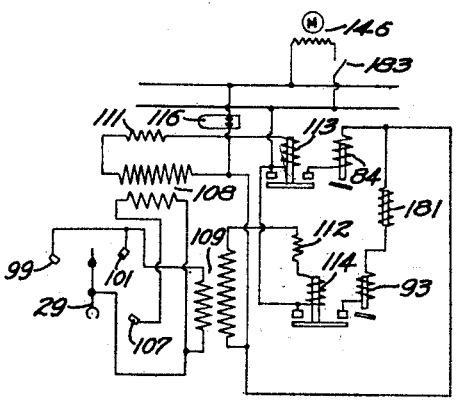
Figure 5 is a diagrammatic view showing the control circuits.

It is desirable to have an automatic switch in series with the primary circuits including the magnets 84 and 93, so that current will flow in the circuits only when necessary. A mercury switch 116, interposed in one of the leads coming from the source of current, as shown diagrammatically in Figure 5, is preferably employed. The switch includes a mercury containing tube 117 secured to a spring base 118; one end of the base being secured to and spaced from the plate 57 by the bolt 119 and spacer 121. The other end of the spring normally bears against the plate, through the adjustable bolt 122, and in this position the switch is inclined so as to be open.

The mercury switch is operated by a suitable control. A rod 123, pivoted to the arm 63 by the pin 66, is slidably mounted on the under side of the plate 57 in guide brackets 124 and 126, and is resiliently positioned by a spring 127 surrounding the rod 123 and compressed between the bracket 124 and a pin 128 secured to the rod.

The free end of the rod is normally adjacent the mercury switch when the gate portions 59 and 61 are in the closed position; but when the gate portions are opened, the free end of the rod is of such length to pass over and bear down on the switch spring base 118, thus causing the tube 117 to tilt. Consequently, the enclosed mercury will flow to bridge the contact points 129 and 131 and close the circuit, thus conditioning the control to operate either of the relays and hence energize the magnets 84 and 93 when the proper scale electrodes register.

While the material is flowing into the container 53, it is desirable to tamp the sack to pack the material; and since it is also desirable not to let this interfere with the taking of accurate and delicate weighings, means are preferably provided whereby the container is only tamped for a short period.

This is accomplished by a tamping mechanism and a suitable control. A table 132 is mounted on the floor 6 adjacent the container 53, and has pivoted thereon a pair of beater arms 133 adapted to beat against sides of the container. Each arm is provided with a round headed extension 134 for engaging the recesses 136 formed in the sides of a block 137, slidable in the guideways 138 mounted on the top of table 132. By this arrangement, it is apparent that when the sliding block 137 is reciprocated, the beater arms 133 will vibrate back and forth and beat against the sides of the container to pack the enclosed material.

The reciprocation of block 137 is effected by a crank mechanism comprising a shaft 139 journaled on the table 132 in a bearing 141. A face plate 142 is formed on one end of the shaft 139, and a connecting rod 143 is journaled on a suitable pin 144 mounted on the face of the plate. The connecting rod 143 is also pivoted on the block 137, so that when the shaft 139 is rotated the block will be reciprocated. Rotation of the shaft is effected by a suitable prime mover, such as the motor 146, carrying a pinion 147 meshed with a gear 148 loosely journaled on the shaft 139.

Figure 7:
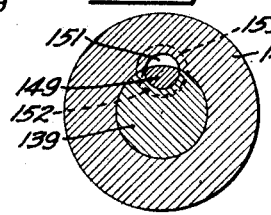
Figure 7 is an enlarged detail sectional view showing the key. The plane of section is indicated by the line 7—7 of Figure 4.

The control for the tamping or vibrating mechanism includes an oscillating semi-circular key 149 arranged in a circular keyway 151 cut so that half of the keyway is in the gear 148 and half is in the shaft 139. Figure 7 shows the half portions of the keyway in registration; the key 149 being wholly in the shaft portion of the keyway. In this position of the key, the gear may rotate freely on the shaft. The key is held against endwise movement by a key flange 152 seated in an annular recess 153 formed similarly to the keyway 151. A collar 154 is secured on the outer end of the shaft 139; and the portion of the key 149 passing therethrough is entirely circular to provide a journal mounting.

Figure 6:
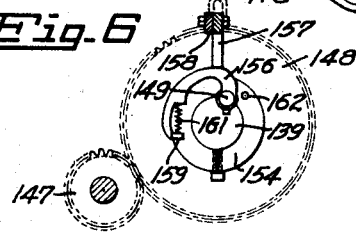
Figure 6 is a detail sectional view of the cam operating mechanism for the tamper; the plane of section being indicated by the line 6—6 of Figure 1.

Means are provided for rotating the key 149 to engage the gear 148, and thus lock the gear and shaft for rotation together. A cam arm 156 is fixed on the outer circular end of the key 149, and is adapted to bear against the downwardly projecting end of a bell crank 157 mounted on the table 132 by a bracket 158. The free end of the cam arm rests against a lug 159 formed on the collar 154; and a spring 161, secured to the lug and cam arm and compressed therebetween, tends to move the arm outward to rotate the key. This arrangement is best illustrated in Figure 6; the cam lever being shown as restrained in the normal position with the key positioned as in Figure 7.

When the bell crank 157 is moved to release the spring pressed cam arm 156, the key 149 will rotate into the gear portion of keyway 151 when the half portions of the keyway come into registration; the rotation of the key being limited by a stop 162 fixed on the collar 154. In the engaged position of the key, the gear and shaft are locked for rotation together, and the block 137 is reciprocated to vibrate the beater arms 133. When the bell crank 157 is allowed to return to its normal position, as shown in Figure 1, the cam arm 156 will ride under the downwardly projecting end thereof and rotate the key 149 back into the shaft portion of the keyway 151. This will free the gear 148, and stop the vibration of the beater arms 133.

Means, controlled by the operator and the scale, are provided for operating the tamper mechanism control key. The projecting end of the gate arm 63, as shown in Figure 8, is provided with a pin 163 engaging an arcuate guide slot 164 of the plate 57.

Pivoted on the under side of the plate 57, by a pin 166, is a lever 167 having a free end extending across the guide slot 164. The other end of the lever 167 is coupled to a rod 168 slidably mounted on the plate 57 in a bracket 169. A spring 171, surrounding the rod 168 and compressed between the rod bracket 169 and a rod fixed pin 172, resiliently holds the rod to maintain the lever 167 in its position across the guide slot 164.

Figure 3:
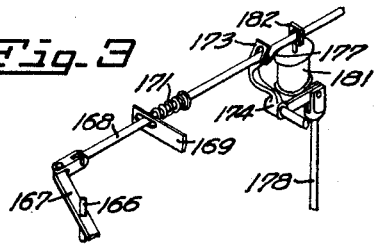
Figure 3 is a fragmentary isometric view showing a portion of the beater control mechanism, looking in the direction of arrow 3 in Figure 1.
Figure 4:
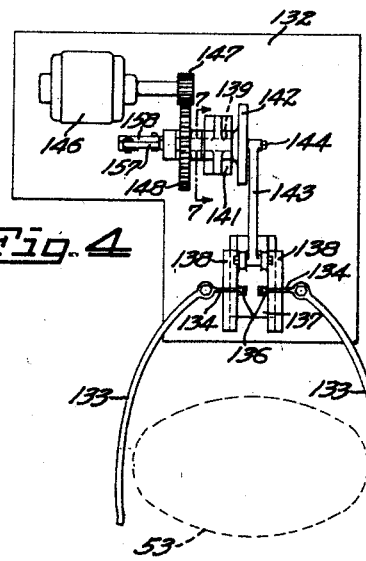
Figure 4 is a plan view of the tamping mechanism; the direction of the view being indicated by arrow 4 of Figure 1.
Figure 2:
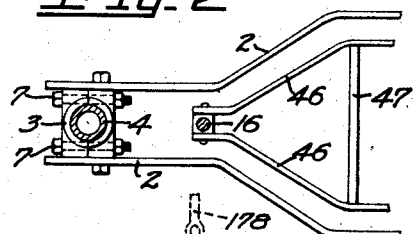
Figure 2 is a fragmentary horizontal sectional view showing the container supporting arms, taken in a plane indicated by the line 2—2 of Figure 1.

The rear end of the rod 168 passes through a loop 173 formed on the end of a bell crank 174 journaled on the plate 57 in a suitable bracket 176. A lug 177 is formed on the rod 168, and is adapted to engage the bell crank 174, adjacent the lower edge of the loop 173, as the rod moves forward; this construction permitting the rod to pull the bell crank forward. The lug 177 slopes upward toward the rear, and the loop 173 is large enough to permit both rod and lug to pass therethrough, so that the lug will ride thru bell crank loop as the rod moves backward. This arrangement is clearly shown in Figure 3.

A downwardly extending link 178 pivotally connects the rod engaging bell crank 174 with the cam actuating bell crank 157; and a spring 179, connected between the lower end of the link and the table 132, tends to keep the bell crank 157 in its normal position over the cam arm 156, as shown in Figure 1. In this normal position, that position when the key 149 is wholly in the shaft 139 and the beater arms are not vibrating, the looped end of the bell crank 174 is engaged by the rod lug 177.

As the gate portions 59 and 61 are opened, however, and held in the wide open position, the pin 163 of the gate portion arm 63 bears against the lever 167 to slide the rod 168 forward. This movement causes the lug 177 to drag along the looped end of the bell crank 174 to disengage the cam actuating bell crank 157 and start the beater arms 133 vibrating.

Means are provided for stopping the tamping at a time before the gate portions are partially closed. This is effected by a solenoid 181 having a plunger 182 adapted to engage the rear end of the rod 168. The solenoid is mounted on the plate 57, and is connected in series with the magnet 93 which operates to completely close the gate portions as has previously been described. When the solenoid 181 is energized, its plunger 182 is thrown upwardly to disengage the lug 177 from the bell crank loop 173. As a result, the spring 179 pulls the cam actuating bell crank 157 downwardly to its normal position over the cam arm 156, and thus stop the vibration of the beater arms 133.

It is to be noted that the lug 177, due to its sloping rear portions, may ride back through the loop 173 to re-engage the bell crank 174 when the gate portions are finally completely closed. This conditions the beater control for repeating the above cycle of operations when a new container is to be filled and the gate portions are again opened.

In the operation of the weighing apparatus, considering that the motor 146 has been started by a conveniently located switch 183, that the hopper 56 contains the filling material, and a container 53 is in place, the handle bar 69 is pulled forward until the trigger catch 81 engages the end of finger 82. The gate portions 59 and 61 are now held in the wide open position and material flows freely into the container.

When the handle bar 69 is brought forward in the above operation, the rod 168 is also moved forward, and the engagement of lug 177 with the bell crank 174 causes the disengagement of the cam actuating bell crank 157 and a consequent rotation of the key 149 to lock shaft 139 and the gear 148 together. This starts the beater arms 133 vibrating to beat the sides of the container 53 and tamp the enclosed material. As the material flows into the container, the indicator 29 of the scale moves around the dial 41 until it registers with the electrode 101; the position of this electrode depending, of course, upon the predetermined setting of electrode 99 which is set in accordance with the particular quantity of material to be weighed.

Upon registration of indicator 29 and electrode 101, relay 114 is closed momentarily and the solenoid 181 and magnet 93 are simultaneously excited. The excitation of magnet 93, to cause its armature hammer to strike against the finger 88, does not have any effect, because the trigger 74 is being held by the finger 82. The excitation of solenoid 181, however, causes its plunger to lift the rod 168 and release the bell crank 174 to effect stopping of the action of the beater arms, and consequent tamping of the container.

As the indicator 29 continues to move about the scale dial 41, it comes into registration with the electrode 107. Consequently, the relay 113 is closed momentarily, and the magnet 84 is excited. The magnet armature hammer 87 is thus caused to strike against the finger 82, and the trigger 74 is released and allowed to slide back until its catch 91 engages the finger notch 89. This action effects a partial closing of the gate portions 59 and 61, so that the material continues to flow, but at a reduced rate.

As the material flows into the container at the reduced rate, the indicator 29 continues about the scale dial 41 until it reaches the predetermined scale reading and comes into registration with electrode 99. The relay 114 is now again closed momentarily to excite the magnet 93 and solenoid 181. This causes the hammer of its armature 92 to strike against the finger 88, and thereby release the trigger 74 and permit the complete closing of the gate portions to stop the flow of material. The upward movement of the solenoid plunger 182 does not have any effect this time, however, because the rod 168 is already in its rear position. After stopping the discharge of material into the container sack 53, the sack is removed and an empty one is placed on the scale; the above cycle of operations being then repeated.

Figure 12:
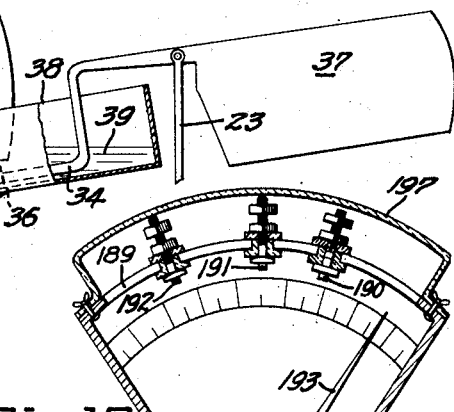
Figure 12 is a vertical sectional view showing a case enclosing a scale indicating and control mechanism, and illustrates another modification of my invention.
Figure 11:
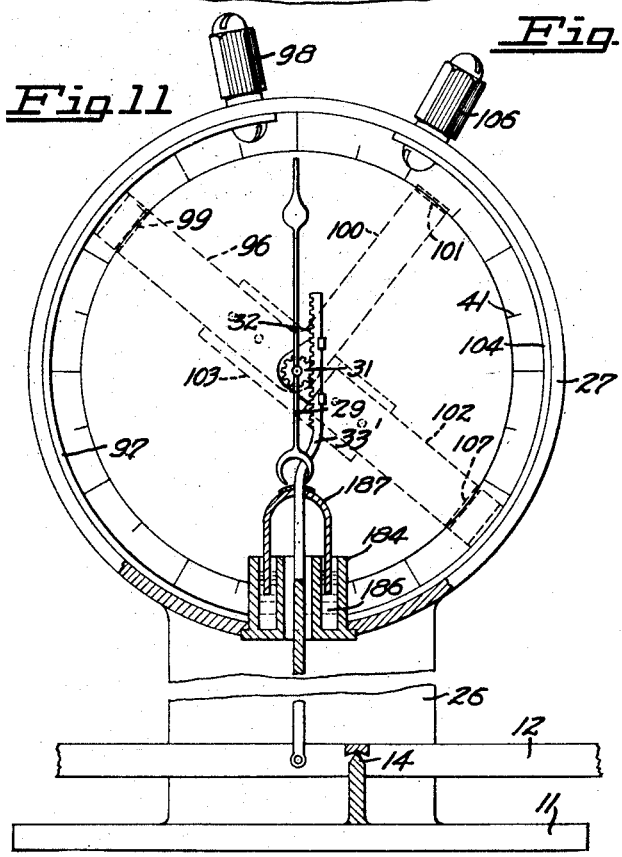
Figure 11 is a similar view showing a modification of my invention.

Although a particular type of scale has been shown as preferably used, it is obvious that others might be employed; two others being shown in the modifications illustrated in Figures 11 and 12. In Figure 11, the dial case 27 is made air-tight by passing the rack rod 33' upward through the bottom of the case in the center of an annular cup 184 containing a fluid 186. The rack rod 33' carries a bell-shaped cap 187 having its lower edges submerged in the fluid 186; thus providing a liquid seal for the dial case. A direct pivot connection is shown between the scale lever 12 and the rack rod 33', but a suitable flex arrangement, such as that shown in Figure 1, may be used.

Figure 10:
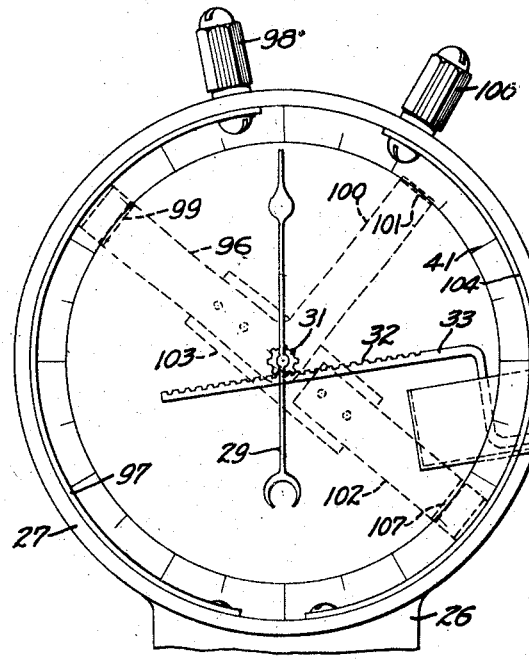
Figure 10 is a front view of the dial case with its cover removed, and shows the indicating and control mechanism of the scale illustrated in Figure 1; the adjustable electrodes being indicated in dotted lines to show the operative relationship.
Figure 13:
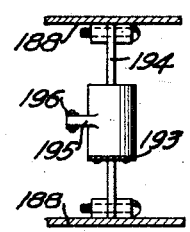
Figure 13 is a fragmentary vertical sectional view showing the indicator supporting flex, taken in the plane indicated by the line 13—13 of Figure 12.

In Figure 12, a scale indicating mechanism is shown mounted in a sector shaped case 188 provided with an open slot 189 on top. The electrodes 190, 191 and 192, which correspond with electrodes 101, 107 and 99, respectively, of Figure 10, are adjustably mounted in the slot 189. An indicator 193, corresponding to indicator 29 of Figure 10, is carried by a flex 194 mounted in the case 188, as shown in Figure 13. An arm 195 extends outwardly from the base of the indicator 193, and connects with the scale lever by a link 196. The lower portion of the case may be sealed by an arrangement similar to that shown in Figure 11; and the upper open slot 188 may be sealed off by a removably mounted cover 197 of suitable insulating material.

I claim:

1. In an apparatus for weighing material, a scale having an indicator movable in accordance with the load thereon, an air-tight case enclosing said indicator, means on the scale for supporting a container in which the material flows as it is weighed, and electric control means associated with said scale indicator for controlling the flow of material into the container.

2. In an apparatus for weighing material, a scale having an indicator movable in accordance with the load thereon, an air-tight case enclosing said indicator, means on the scale for supporting a container in which the material is weighed, means for tamping the container while the material is weighed, and electric control means associated with said scale indicator for controlling the operation of the tamping means.

3. In an apparatus for weighing material, a scale having an indicator movable in accordance with the load thereon, an air-tight case enclosing said indicator, means on the scale for supporting a container in which the material is weighed, a receptacle having an aperture through which the material flows into the container, and electric control means associated with said scale indicator for closing the receptacle aperture after a predetermined quantity of material is weighed.

4. In an apparatus for weighing material, a scale having an indicator movable in accordance with the load thereon, an air-tight case enclosing said indicator, means on the scale for supporting a container in which the material is weighed, a receptacle having an aperture through which the material flows into the container, electric control means associated with said scale indicator for closing the receptacle aperture after a predetermined quantity of material is weighed, and means for tamping the container while the material is being weighed, said electric control operating to stop the tamping means prior to the closing of the receptacle.

5. In an apparatus for weighing material, a scale having an indicator movable in accordance with the load thereon, an air-tight case enclosing said indicator, means on the scale for supporting a container in which the material is weighed, a receptacle having an aperture through which the material flows into the container, electric control means associated with said scale indicator for closing the receptacle aperture after a predetermined quantity of material is weighed, and means for tamping the container while the material is being weighed, said electric control operating to reduce the flow of material and stop the tamping means prior to the closing of the receptacle.

6. In an apparatus for weighing material, a scale having an indicator electrode movable in accordance with the load thereon, an air-tight case enclosing said indicator electrode, an electrode mounted within the case in the path of movement of the indicator electrode and separated therefrom by a variable gap, an electric circuit including the electrodes, means on the scale for supporting a container in which the material flows as it is weighed, and control means operative by completion of the circuit when the electrodes register for controlling the flow of material into the container.

7. In an apparatus for weighing material, a scale having an indicator electrode movable in accordance with the load thereon, an air-tight case enclosing said indicator electrode, an electrode mounted within the case in the path of movement of the indicator electrode and separated therefrom by a variable gap, an electric circuit including the electrodes, means on the scale for supporting a container in which the material is weighed, means for tamping the container, and control means operative by completion of the circuit when the electrodes register for controlling the operation of the tamping means.

8. In an apparatus for weighing material, a scale having an indicator electrode movable in accordance with the load thereon, an air-tight case enclosing said indicator electrode, a pair of electrodes mounted within the case in the path of movement of the indicator electrode, an electric circuit including the electrodes, means on the scale for supporting a container in which the material is weighed, a receptacle having an aperture through which the material flows into the container, means operative by completion of the circuit when the indicator electrode registers with one of the electrodes of said pair for reducing the size of the receptacle aperture, and means operative by completion of the circuit when the indicator electrode registers with the other electrode of said pair for closing the receptacle aperture.

9. In an apparatus for weighing material, a scale having an indicator electrode movable in accordance with the load thereon, an air-tight case enclosing said indicator electrode, electrodes mounted within the case in the path of movement of the indicator electrode, an electric circuit including the electrodes, means on the scale for supporting a container in which the material is weighed, a receptacle having an aperture through which the material flows into the container, means for tamping the container, means operative by completion of the circuit when the indicator electrode registers with one of the electrodes for stopping the stamping means, means operative by completion of the circuit when the indicator electrode registers with another of the electrodes for reducing the size of the receptacle aperture, and means operative by completion of the circuit when the indicator electrode registers with another of the electrodes for closing the receptacle aperture.

10. In an apparatus for weighing material, a scale, means on the scale for supporting a container in which the material is weighed, a pair of beater arms adapted to strike against the sides of the container, means for vibrating the arms to tamp the material enclosed in the container, and means controlled by the scale for stopping said vibrating means after a predetermined amount of material is weighed.

11. In an apparatus for weighing material, a scale, means on the scale for supporting a container in which the material is weighed, a pair of beater arms adapted to strike against the sides of the container, reciprocating means for vibrating the arms, a prime mover for operating said reciprocating means, locking means engageable to operably connect the reciprocating means and prime mover together, and means for optionally engaging or disengaging the locking means.

12. In an apparatus for weighing material, a scale, means on the scale for supporting a container in which the material is weighed, a pair of beater arms adapted to strike against the sides of the container, reciprocating means for vibrating the arms, a prime mover for operating said reciprocating means, a rotatable key engageable to operably connect the reciprocating means and prime mover together, and cam means for rotating the key to optionally engage or disengage the key.

13. In an apparatus for weighing material, a scale, means on the scale for supporting a container in which the material is weighed, a pair of beater arms adapted to strike against the sides of the container, reciprocating means for vibrating the arms, a prime mover for operating said reciprocating means, a rotatable key engageable to operably connect the reciprocating means and prime mover together, cam means for rotating the key, means for operating the cam means to engage the key, and means controlled by the operation of the scale for operating the cam means to disengage the key after a predetermined quantity of material is weighed.

14. A scale for weighing a load comprising a base, a normally horizontal lever pivotally mounted on the base adapted to carry the load, resilient means urging the lever toward the horizontal position, means connected with the lever for indicating the weighing, and a counterweight for the lever, said lever being free from the counterweight in its normal horizontal position.

15. A scale for weighing a load comprising a base, a normally horizontal lever pivotally mounted on the base adapted to carry the load, resilient means urging the lever toward the horizontal position, means connected with the lever for indicating the weighing, and a counterweight for the lever, said counterweight being held in a suspended position above the lever when the lever is horizontal.

16. A scale for weighing a load comprising a base, an air-tight case arranged on the base, an indicator journaled in the case, a rod for actuating the indicator extending through an aperture provided in the case, a liquid seal for the aperture, a lever pivotally mounted on the base adapted to carry the load, and means connecting the lever with the indicator actuating rod for moving the indicator in accordance with the load.

17. A scale for weighing a load comprising a base, a normally horizontal lever pivotally mounted on the base adapted to carry the load, an indicator mounted on the base, means including a flex connecting the lever with the indicator for moving the indicator in accordance with the load, and a counterweight for the lever, said lever being free from the counterweight in its normal horizontal position.

18. A scale for weighing a load comprising a base, a lever pivotally mounted on the base adapted to carry the load, a rocker arm secured to the lever adjacent its pivot, a flex mounted on the base and carrying an arm extending parallel with the rocker arm, a link pivotally connecting the rocker arm and flex arm, an indicator mounted on the base, and means connecting the flex arm with the indicator for moving the indicator in accordance with the load on the lever.

19. A scale for weighing a load comprising a base, an indicator mounted on the base, a lever pivotally mounted on the base adapted to carry the load, means including a flex connecting the lever with the indicator for moving the indicator in accordance with the load, and a dash pot containing a fluid mounted on the base, the piston of said dash pot being connected with the lever to damp its movement.

20. The combination with a scale including an electric control for associated apparatus and having electrodes adapted for registration, of an air-tight case for enclosing the electrodes.

21. The combination with a scale including an electric control for associated apparatus and having an electrode separated from a load indicating electrode by a variable gap, of an air-tight case for enclosing the electrodes.

22. The combination with a scale providing a control for associated apparatus, of an air-tight compartment comprising a case of electrical insulating material, a demountable transparent cover for the case, an indicator electrode mounted within the case adapted to move in accordance with a load on the scale, an adjustable electrode mounted within the case and separated from the indicator electrode by a variable gap, and means for setting the adjustable electrode at a predetermined scale reading.

23. The combination with a scale providing a control for associated apparatus, of an air-tight compartment comprising a case of electrical insulating material, a demountable transparent cover for the case, an indicator electrode mounted within the case adapted to move in accordance with a load on the scale, an adjustable electrode mounted within the case and separated from the indicator electrode by a variable gap, and means accessible from the exterior of the case for setting the adjustable electrode at a predetermined scale reading.

24. The combination with a scale providing a control for associated apparatus, of an air-tight compartment comprising a case of electrical insulating material, a demountable transparent cover for the case, an indicator electrode mounted within the case adapted to move in accordance with a load on the scale, a plurality of spaced electrodes adjustably mounted within the case and separated from the indicator electrode by variable gaps, and means for setting the adjustable electrodes at predetermined scale readings.

25. The combination with a scale providing a control for associated apparatus, of an air-tight compartment comprising a case of electrical insulating material, a demountable transparent cover for the case, an indicator electrode mounted in the case, means extending through an aperture provided in the case for moving the indicator electrode in accordance with a load on the scale, a seal for the aperture, and an electrode mounted within the case and separated from the indicator electrode by a variable gap.

26. A compartment for enclosing an electric control for associated apparatus comprising a case, an electrode movably mounted in the case, another electrode adjustably mounted in the case and adapted for registration with the movable electrode, and means for sealing the case about the electrodes.

27. A compartment for enclosing an electric control for associated apparatus comprising an air-tight case, an electrode movably mounted in the case, an adjustable electrode journaled in the case and adapted for registration with the movable electrode, and means accessible from the exterior of the case for setting the adjustable electrode.

In testimony whereof, I have hereunto set my hand.

WILLIAM H. REES.